US012669662B2

(12) United States Patent
Li et al.

(10) Patent No.: US 12,669,662 B2
(45) Date of Patent: Jun. 30, 2026

(54) OPTICAL MODULE, COMMUNICATION SINGLE BOARD, COMMUNICATION DEVICE, AND DETECTION METHOD FOR PRE-PULLOUT OF OPTICAL MODULE

(71) Applicant: ZTE CORPORATION, Shenzhen (CN)

(72) Inventors: Bowei Li, Shenzhen (CN); Qian Guo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 270 days.

(21) Appl. No.: 18/568,654

(22) PCT Filed: Jun. 6, 2022

(86) PCT No.: PCT/CN2022/097103
§ 371 (c)(1),
(2) Date: Dec. 8, 2023

(87) PCT Pub. No.: WO2022/257873
PCT Pub. Date: Dec. 15, 2022

(65) Prior Publication Data
US 2024/0272386 A1       Aug. 15, 2024

(30) Foreign Application Priority Data

Jun. 8, 2021     (CN) .......................... 202110637842.8

(51) Int. Cl.
*H04B 10/00*          (2013.01)
*G02B 6/42*           (2006.01)
(52) U.S. Cl.
CPC ......... *G02B 6/4261* (2013.01); *G02B 6/4219* (2013.01); *G02B 6/4245* (2013.01)

(58) Field of Classification Search
CPC .. G02B 6/4261; G02B 6/4219; G02B 6/4245; G02B 6/4278; G02B 6/4246; H04B 10/40; H04B 10/073
See application file for complete search history.

(56) References Cited

U.S. PATENT DOCUMENTS 7,296,937 B1 * 11/2007 Bright ................. G02B 6/4284
                                                            385/88
9,146,366 B2 * 9/2015 Koutrokois ......... G02B 6/4277
(Continued)

FOREIGN PATENT DOCUMENTS

CN          203502629 U      3/2014
CN          108037568 A      5/2018
(Continued)

OTHER PUBLICATIONS

WIPO, International Search Report issued on Aug. 4, 2022.
European Patent Office, EP22819471.8 Extended European Search Report issued on Sep. 10, 2024.

*Primary Examiner* — Agustin Bello
(74) *Attorney, Agent, or Firm* — Li & Cai Intellectual Property (USA) Office

(57) ABSTRACT

Provided in the present disclosure are an optical module, a communication single board, a communication device, and a detection method for detecting pre-pullout of an optical module. The optical module includes: a housing having a first side portion and a second side portion arranged opposite each other, at least one of them being provided with a sliding track and a limiting hole; an unlocking member including a sliding sheet and a snap-fit fastener connected thereto, the sliding sheet being reciprocatable along the sliding track and is disposed in the limiting hole; a traction member connected to an end of the sliding sheet away from the snap-fit fastener; and a first sensor located on the traction member, and configured to generate an alarm signal when the traction (Continued)

member is pulled to cause the communication single board to adjust a service of a communication port thereof.

20 Claims, 3 Drawing Sheets

(56) References Cited

U.S. PATENT DOCUMENTS

| | | | | |
|---|---|---|---|---|
| 9,230,416 | B2 * | 1/2016 | Ward | G02B 6/3895 |
| 10,215,935 | B2 * | 2/2019 | Scherer | G02B 6/36 |
| 10,302,879 | B2 * | 5/2019 | Wang | G02B 6/4203 |
| 10,606,001 | B1 | 3/2020 | Ko | |
| 10,944,584 | B1 * | 3/2021 | Cheng | H04L 12/2801 |
| 11,165,199 | B2 * | 11/2021 | Xu | H01R 13/6335 |
| 2007/0258682 | A1 | 11/2007 | Bright | |
| 2010/0054749 | A1 * | 3/2010 | Hosking | H04B 10/40 |
| | | | | 398/135 |
| 2014/0035755 | A1 | 2/2014 | Rafik | |
| 2014/0104808 | A1 | 4/2014 | Koutrokois | |
| 2014/0156879 | A1 * | 6/2014 | Wong | G06F 11/3055 |
| | | | | 710/19 |
| 2016/0054527 | A1 * | 2/2016 | Tang | G02B 6/3895 |
| | | | | 439/155 |
| 2024/0272386 | A1 * | 8/2024 | Li | G02B 6/4245 |

FOREIGN PATENT DOCUMENTS

| | | | |
|---|---|---|---|
| CN | 109828336 A | 5/2019 | |
| CN | 111751938 A | 10/2020 | |
| CN | 113078943 A | 7/2021 | |
| JP | H 7336306 A | 12/1995 | |

* cited by examiner

601

602

103

Determine, via a sensor, whether a traction member of the optical module is pulled — S701

Yes

Generate an alarm signal by the sensor — S702

Control a communication single board to adjust a service of a communication port thereof according to the alarm signal — S703

OPTICAL MODULE, COMMUNICATION SINGLE BOARD, COMMUNICATION DEVICE, AND DETECTION METHOD FOR PRE-PULLOUT OF OPTICAL MODULE

CROSS-REFERENCE TO RELATED APPLICATIONS

This application claims priority to Chinese patent application No. 202110637842.8 filed on Jun. 8, 2021, the disclosure of which is hereby incorporated by reference in its entirety.

TECHNICAL FIELD

The present disclosure belongs to the technical field of optical communications, and particularly relates to an optical module, a communication single board, a communication device, and a detection method for detecting pre-pullout of an optical module.

BACKGROUND

With the increasing demands for network traffic, the functions and performances that routers need to realize are also increasing. With the increasing integration degree of the router, the speed of optical modules used in the router is also getting higher, and the use of optical modules, such as QSFP28/QSFP56/QSFP-DD/CXP types, has become a main trend.

A current optical module generally has a speed between 100 to 400 G. In use, the optical module often needs to be plugged or pulled out, which may cause instant traffic packet loss, and a higher speed of the optical module may lead to more serious traffic packet loss, as well as a greater influence on the communication service.

SUMMARY

To solve at least one of the technical problems in the existing art, the present disclosure provides an optical module, a communication single board, a communication device, and a detection method for detecting pre-pullout of an optical module.

In a first aspect, an embodiment of the present disclosure provides an optical module, including: a housing, an unlocking member, a traction member, and a first sensor; wherein the housing has a first side portion and a second side portion arranged opposite each other, and at least one of the first side portion or the second side portion is provided with a sliding track and a limiting hole: the unlocking member includes: a sliding sheet and a snap-fit fastener connected to the sliding sheet, wherein the sliding sheet is reciprocatable along the sliding track, and the snap-fit fastener is disposed in the limiting hole: the traction member is connected to an end of the sliding sheet away from the snap-fit fastener; and the first sensor is located on the traction member, and is configured to generate an alarm signal when the traction member is pulled, and send the alarm signal to a communication single board to cause the communication single board to adjust a service of a communication port of the communication single board.

In some embodiments, the optical module is configured such that in a first stage of a process of pulling the optical module out of the communication port by pulling the traction member, a relative position between the housing of the optical module and the communication port remains unchanged, and the sliding sheet is moved relative to the sliding track, and the optical module is unlocked relative to the communication port through the snap-fit fastener; and in a second stage of the process, a relative position between the sliding sheet and the sliding track remains unchanged, while the housing is moved in a direction away from the communication port. In the first stage, the first sensor sends the alarm signal to the communication single board.

In a second aspect, an embodiment of the present disclosure provides a communication single board including a plurality of communication ports each adapted to be connected to an optical module, the optical module including a traction member; wherein the communication single board includes a second sensor: wherein each communication port is provided with a locking structure therein, the second sensor is provided on the locking structure, and the second sensor is configured to generate an alarm signal when the traction member is pulled, to cause the communication single board to adjust a service of a communication port of the communication single board.

In some embodiments, the communication single board adjusting the service of the communication port of the communication single board includes: stopping a service of the communication port corresponding to the optical module to be pulled out, and allocating communication signals corresponding to the service to another communication port for processing.

In some embodiments, the locking structure is configured to lock the optical module to the communication port, and the locking structure is capable of being unlocked by the traction member.

In a third aspect, an embodiment of the present disclosure provides a communication device, including the optical module and the communication single board according to the first aspect: wherein the optical module is connected to the communication port of the communication single board.

In a fourth aspect, an embodiment of the present disclosure provides a communication device, including the communication single board and the optical module according to the second aspect: wherein the optical module is connected to the communication port of the communication single board.

In a fifth aspect, an embodiment of the present disclosure provides a detection method for detecting pre-pullout of an optical module, including: determining, via a sensor, whether a traction member of the optical module is pulled: generating an alarm signal by the sensor in response to determining that the traction member of the optical module is pulled; and controlling a communication single board to adjust a service of a communication port of the communication single board according to the alarm signal. The optical module may be an optical module according to the first aspect.

DETAIL DESCRIPTION OF EMBODIMENTS

To improve understanding of the technical solution of the present disclosure for those skilled in the art, the present disclosure will be described in detail below with reference to accompanying drawings and specific implementations.

Unless otherwise defined, technical or scientific terms used in the present disclosure are intended to have general meanings as understood by those of ordinary skill in the art. The words "first", "second" and similar terms used in the present disclosure do not denote any order, quantity, or importance, but are used merely for distinguishing different components from each other. Also, the use of the terms "a", "an", or "the" and similar referents do not denote a limitation of quantity, but rather denote the presence of at least one. The word "include" or "comprise" or the like means that the element or item preceding the word includes elements or items that appear after the word or equivalents thereof, but does not exclude other elements or items. The terms "connected" or "coupled" and the like are not restricted to physical or mechanical connections, but may include electrical connections, whether direct or indirect. The words "top", "bottom", "left", "right", or the like are merely used to indicate a relative positional relationship, and when an absolute position of the described object is changed, the relative positional relationship may be changed accordingly.

With the development and construction of the optical fiber access technology, optical fiber communication has entered various fields of work and life, where the optical module plays a more and more important role. The optical module is mainly used for transmitting and receiving optical signals in optical fiber communication, and implementing the function of mutual conversion between optical signals and electric signals. In current practical applications, a small form factor pluggable (SFP) optical module is generally used, the communication single board has a plurality of communication ports, and the optical module may be installed at a corresponding communication port of the communication single board to perform signal conversion and implement a communication function. When communication is not desired or it is necessary to change to a different model of optical module, the optical module may be pulled out of the corresponding communication port so as to save resources. In the embodiments of the present disclosure and the following description, a quad small form factor pluggable-double density (QSFP-DD) optical module is taken as an example for explanation.

Figure 1:
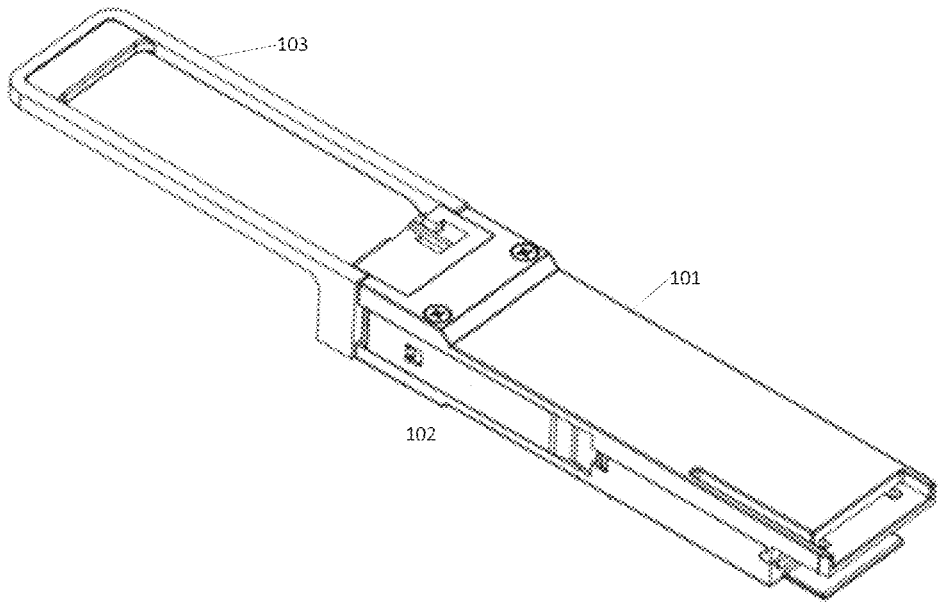
FIG. 1 is a schematic structural diagram of an exemplary optical module.

FIG. 1 is a schematic structural diagram of an exemplary optical module in the existing art. As shown in FIG. 1, the optical module includes: a housing 101, an unlocking member 102, and a traction member 103. The unlocking member 102 is located in the housing 101 and connected to the traction member 103, and the unlocking member 102 can reciprocate in the housing 101 along a plugging direction and a pulling direction. When the optical module is plugged into a communication port of a communication single board, the housing 101 may be locked with a locking structure on the communication port, so that the entire optical module cannot be pulled out of the communication port of the communication single board, therefore looseness between the optical module and the communication port of the communication single board in the application process is prevented, and the signal transmission effect will not be affected thereby. When the optical module is to be pulled out of the communication port of the communication single board, the user pulls the traction member 103 with his/her hand so that the traction member 103 drives the unlocking member 102 to slide and unlock from the locking structure of the communication port. At this time, no actual relative movement occurs between the housing of the optical module and the communication port of the communication single board. Then, the user further pulls the traction member 103 so that the optical module is formally pulled out of the communication port of the communication single board. When the optical module is formally pulled out of the communication port of the communication single board, instant traffic data loss tends to occur, and a higher speed of the optical module may lead to more serious data traffic packet loss, as well as a greater influence on the communication service.

In order to solve at least one of the above technical problems, the present disclosure provides an optical module, a communication single board, a communication device, and a detection method for detecting pre-pullout of an optical module. The optical module, the communication single board, the communication device, and the detection method for detecting pre-pullout of an optical module according to the present disclosure will be described in further detail below with reference to the accompanying drawings and specific implementations.

Figure 2:
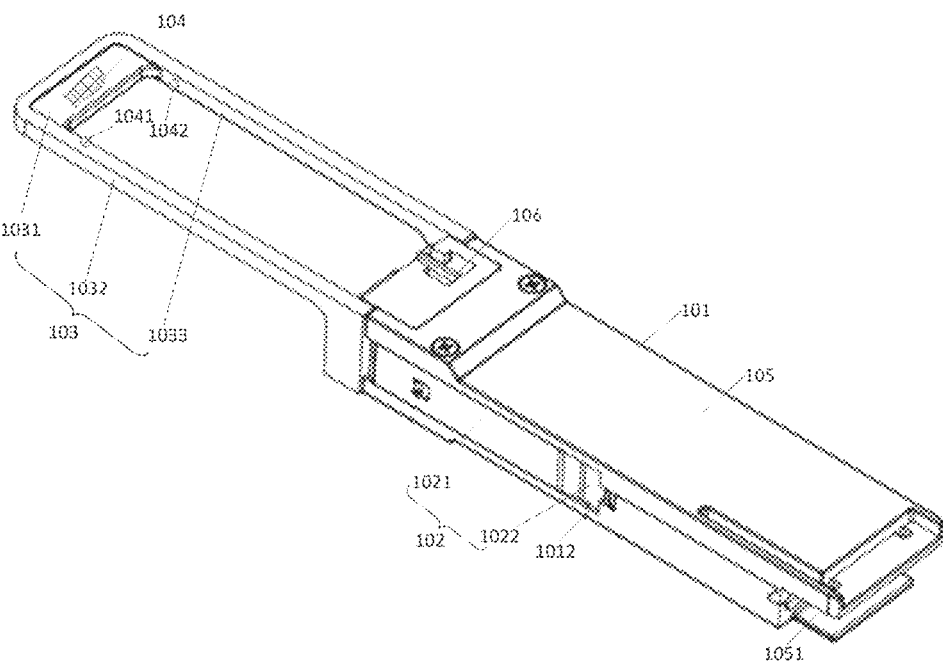
FIG. 2 is a schematic structural diagram of an optical module according to an embodiment of the present disclosure.
Figure 3:
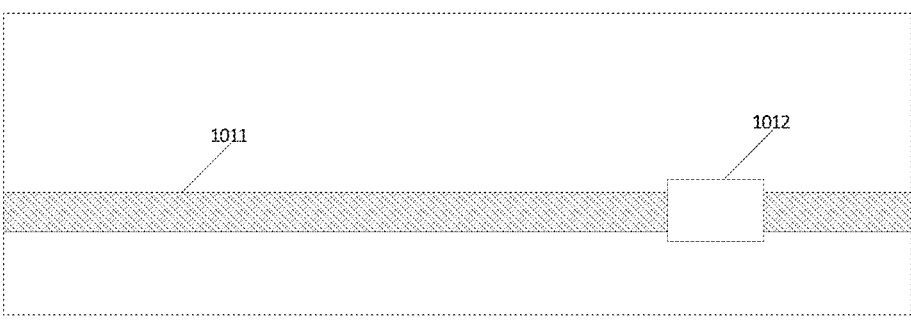
FIG. 3 is a partial structural diagram of a housing of the optical module shown in FIG. 2.
Figure 4:
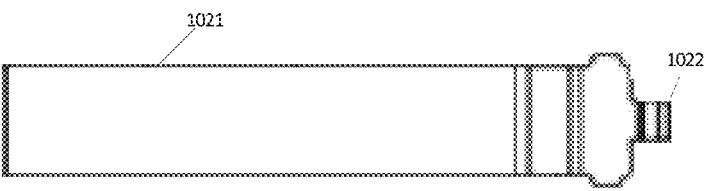
FIG. 4 is a schematic structural diagram of an unlocking member of the optical module shown in FIG. 2.

In a first aspect, an embodiment of the present disclosure provides an optical module. FIG. 2 is a schematic structural diagram of an optical module according to an embodiment of the present disclosure. As shown in FIG. 2, the optical module includes: a housing 101, an unlocking member 102, a traction member 103, and a first sensor 104. FIG. 3 is a partial structural diagram of the housing of the optical module shown in FIG. 2. As shown in FIGS. 2 and 3, the housing 101 has a first side portion and a second side portion arranged opposite each other, and at least one of the first side portion or the second side portion is provided with a sliding track 1011 and a limiting hole 1012. FIG. 4 is a schematic structural diagram of the unlocking member of the optical module shown in FIG. 2. As shown in FIGS. 2 and 4, the unlocking member 102 includes a sliding sheet 1021 and a snap-fit fastener 1022 connected to the sliding sheet 1021. The sliding sheet 1021 can reciprocate along the sliding track 1011; and the snap-fit fastener 1022 is disposed in the limiting hole 1012. The traction member 103 is connected to an end of the sliding sheet 1021 away from the snap-fit fastener 1022. The first sensor 104 is located on the traction member 103, and is configured to generate an alarm signal when the traction member 103 is pulled and send the alarm signal to a communication single board to cause the communication single board to adjusts a service of a communication port of the communication single board.

When the optical module is plugged into the communication port of the communication single board, the limiting hole 1012 in the housing 101 is locked with a locking structure on the communication port, so that the entire optical module cannot be pulled out of the communication port of the communication single board, and the signal transmission effect is prevented from being affected by looseness between the optical module and the communication port of the communication single board in the application process. When pulling the optical module out of the communication port of the communication single board, the user pulls the traction member 103 with his/her hand so that the traction member 103 drives the sliding sheet 1021 of the unlocking member 102 to slide on the sliding track 1011 along a pulling direction, and the snap-fit fastener 1022 is ejected outwardly, thereby the optical module is unlocked from the locking structure of the communication port, while no actual relative movement occurs between the optical module and the communication port of the communication single board. There is a certain time difference between this stage (first stage) and the stage (second stage) of formally pulling the optical module out of the communication port of the communication single board. In the first stage, the first sensor 104 may detect that the user is about to pull the optical module out of the communication port of the communication single board. At this time, the first sensor 104 may generate an alarm signal and transmit the alarm signal to the communication single board, and the communication single board may adjust a service of a communication port of the communication single board according to the alarm signal, for example, stop the service of the corresponding communication port and allocate corresponding communication signals to another communication port for processing. In this manner, it can be ensured that normal services at each communication port in the communication single board are not affected when the optical module is pulled out of a communication port of the communication single board, and data traffic packet loss can be avoided, thereby improving the communication quality.

In some embodiments, the communication single board has a plurality of communication ports each provided with a QSFP-DD optical module (numbered A, B, C, D . . . ). When each communication port is processing a normal service, if the optical module A needs to be pulled out and replaced with an optical module of the same model but of another brand, the user may pull the traction member 103 of the optical module A. The first sensor 104 on the optical module A detects the behavior that the user is about to pull the optical module out, generates an alarm signal and transmits the alarm signal to the communication single board. Then, the communication single board may stop the service of the communication port corresponding to the optical module A according to the alarm signal, and allocate corresponding communication signals to communication ports corresponding to the optical modules B, C and D. In this manner, the optical module A can be pulled out without any data traffic loss, and traffic packet loss can be avoided, thereby improving the communication quality.

In some embodiments, as shown in FIG. 2, the housing 101 further has a bottom portion connected to both the first side portion and the second side portion; and the optical module further includes a main body structure 105. The main body structure 105 is fixed on the bottom portion and is provided with a plurality of redundant pins 1051; and at least one of the plurality of redundant pins 1051 is multiplexed as an alarm pin configured to transmit the alarm signal. The main body structure 105 may be an optical module gold finger, and may be electrically connected to the first sensor 104 via a wire.

Figure 5:
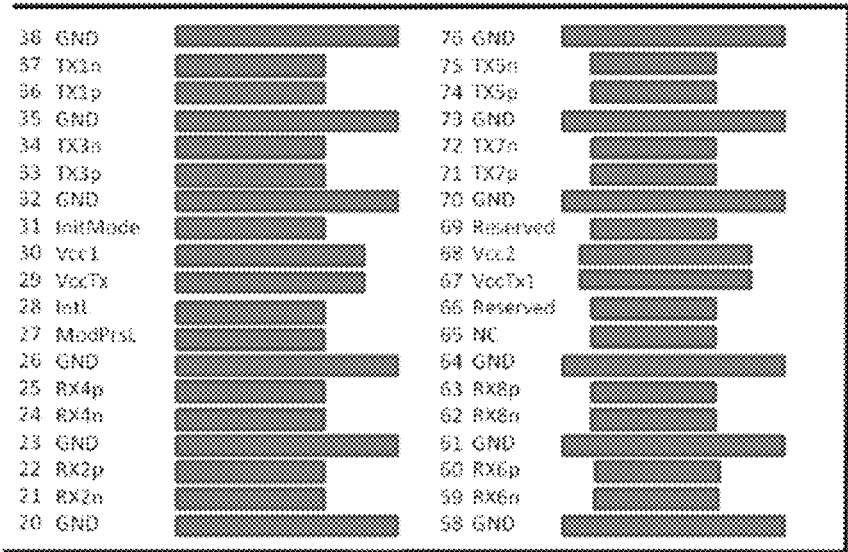
FIG. 5 is a schematic structural diagram of pins of an optical module according to an embodiment of the present disclosure.

FIG. 5 is a schematic structural diagram of pins of an optical module according to an embodiment of the present disclosure. As shown in FIGS. 2 and 5, the main body structure 105 of the optical module is provided with a plurality of pins each configured to transmit a corresponding communication signal, the corresponding communication port of the communication single board is provided with a plurality of gold finger connectors, and the pins may be connected to respective gold finger connectors to implement communication between the optical module and the communication single board. Among the pins of the optical module, some are redundant pins 1051 where no communication signal is accessed, and these redundant pins may be used as alarm pins, such as either of the two pins labeled as "Reserved" in FIG. 5. In normal applications, a high level signal may be transmitted through the alarm pin to indicate that the optical module is in place. When the optical module is about to be pulled out, the first sensor 104 may generate an alarm signal, and at this time, a low level signal may be transmitted through the alarm pin to indicate a sudden change of the level signal in the alarm pin. Accordingly, the communication single board adjusts services of communication ports of the communication single board, i.e., the communication single board stops a service of a communication port corresponding to the optical module about to be pulled out, and allocates corresponding communication signals to a communication port corresponding to another optical module for processing. In this manner, the optical module can be pulled out without any data traffic loss, and traffic packet loss can be avoided, thereby improving the communication quality.

In some embodiments, as shown in FIG. 2, the traction member 103 includes: a handheld portion 1031, and a first connecting portion 1032 and a second connecting portion 1033 arranged opposite to each other. The handheld portion 1031 is connected to the sliding sheet 1021 through the first connecting portion 1032 and the second connecting portion 1033. The first sensor 104 is located on the handheld portion 1031, the first connecting portion 1032, or the second connecting portion 1033.

In an embodiment of the present disclosure, there are two sliding sheets 1021 corresponding to two sliding tracks 1011, and the first connecting portion 1032 and the second connecting portion 1033 are respectively connected to the two sliding sheets and both connected to the handheld portion 1031, so that the handheld portion 1031, the first connecting portion 1032 and the second connecting portion 1033 may form a U-shaped structure with a space into which a finger of a user can be inserted to pull or snap the handheld portion 1031. It will be understood that the traction member 103 may further include a third connecting portion connected to both the first connecting portion 1032 and the second connecting portion 1033, so that the traction member 103 may form a square ring or circular ring structure. The shape of the traction member 103 may be appropriately designed according to actual needs, and is not limited herein. Each component in the traction member 103 is generally made of plastic or rubber, which can increase a friction between the traction member and the user's finger to facilitate pulling or snapping while playing an insulating role. The first sensor 104 may be installed on the handheld portion 1031, the first connecting portion 1032, or the second connecting portion 1033 of the traction member 103, and may detect an action of pulling the traction member 103 by a user to generate an alarm signal, so that the communication single board can adjust the service at each communication port timely, and data traffic packet loss can be avoided, thereby improving the communication quality.

In some embodiments, the first sensor 104 includes: a micro mechanical key located on the handheld portion 1031.

As shown in FIG. 2, the first sensor 104 may specifically include or be a micro mechanical key, and when a user pulls the traction member 103, the user hooks the handheld portion 1031 of the traction member 103 with a finger and applies a force, thereby touching the micro mechanical key. When the optical module is inserted into the communication port of the communication single board with no other action applied, the micro mechanical key is in a state in which the alarm pin in the main body structure 105 may transmit a high level signal, while other pins may transmit corresponding communication signals, so as to implement communication between the optical module and the communication single board. When the optical module needs to be pulled out, the user pulls the traction member 103 of the optical module so that the traction member 103 drives the sliding sheet 1021 of the unlocking member 102 to slide on the sliding track 1011 along a pulling direction, and the snap-fit fastener 1022 is ejected outwardly, thereby the optical module is unlocked from the locking structure of the communication port. At this time, the user's finger will touch and press the micro mechanical key so that the state of the micro mechanical key is changed, while a low level signal will be transmitted through the alarm pin to the communication single board. Accordingly, the communication single board adjusts services of communication ports of the communication single board, i.e., the communication single board stops a service of a communication port corresponding to the optical module about to be pulled out, and allocates corresponding communication signals to a communication port corresponding to another optical module for processing. In this manner, the optical module can be pulled out without any data traffic loss, and traffic packet loss can be avoided, thereby improving the communication quality. After the locking structure is unlocked (at this time, the service adjustment of the communication port is also completed), further pulling the traction member 103 outward will make the housing 101 (including the sliding track 1011, the limiting hole 1012, the pins, etc.) of the optical module move outward relative to the communication port, until the optical module is completely pulled out. In order to prevent the micro mechanical key from affecting the user's pulling of the traction member 103, the micro mechanical key is embedded in a groove of the handheld portion 1031, and has a height generally greater than or equal to the depth of the groove, so that the performance of the micro mechanical key and the appearance design of the optical module are not affected.

In some embodiments, the first sensor 104 includes: a pressure sensor located on the handheld portion 1031.

As shown in FIG. 2, the first sensor 104 may specifically include or be a pressure sensor, and when a user pulls the traction member 103, the user hooks the handheld portion 1031 of the traction member 103 with a finger and applies a force, thereby touching the pressure sensor. When the optical module is inserted into the communication port of the communication single board with no other action applied, the pressure sensor is in a state in which the alarm pin in the main body structure 105 may transmit a high level signal, while other pins may transmit corresponding communication signals, so as to implement communication between the optical module and the communication single board. When the optical module needs to be pulled out, the user pulls the traction member 103 of the optical module so that the traction member 103 drives the sliding sheet 1021 of the unlocking member 102 to slide on the sliding track 1011 along a pulling direction, and the snap-fit fastener 1022 is ejected outwardly, thereby the optical module is unlocked from the locking structure of the communication port. At this time, the user's finger will touch the pressure sensor so that the state of the pressure sensor is changed, while a low level signal will be transmitted through the alarm pin to the communication single board. Accordingly, the communication single board adjusts services of communication ports of the communication single board, i.e., the communication single board stops a service of the communication port corresponding to the optical module about to be pulled out, and allocates corresponding communication signals to a communication port corresponding to another optical module for processing. In this manner, the optical module can be pulled out without any data traffic loss, and traffic packet loss can be avoided, thereby improving the communication quality. In order to prevent the pressure sensor from affecting the user's pulling of the traction member 103, the pressure sensor is embedded in a groove of the handheld portion 1031, and has a height generally greater than or equal to the depth of the groove, so that the performance of the pressure sensor and the appearance design of the optical module are not affected.

In some embodiments, the first sensor 104 includes: an optical transmitter 1041 and an optical receiver 1042; the optical transmitter 1041 is located on the first connecting portion 1032; and the optical receiver 1042 is located on the second connecting portion 1033.

As shown in FIG. 2, the first sensor 104 may specifically include or be an optical transmitter 1041 and an optical receiver 1042, and when a user pulls the traction member 103, the user hooks the handheld portion 1031 of the traction member 103 with a finger and applies a force, thereby blocking light emitted from the optical transmitter 1041. When the optical module is inserted into the communication port of the communication single board with no other action applied, the optical receiver 1042 may receive a specific optical signal sent from the optical transmitter 1041, and the optical receiver 1042 is in a state in which the alarm pin in the main body structure 105 may transmit a high level signal, while other pins may transmit corresponding communication signals, so as to implement communication between the optical module and the communication single board. When the optical module needs to be pulled out, the user pulls the traction member 103 of the optical module so that the traction member 103 drives the sliding sheet 1021 of the unlocking member 102 to slide on the sliding track 1011 along a pulling direction, and the snap-fit fastener 1022 is ejected outwardly, thereby the optical module is unlocked from the locking structure of the communication port. At this time, the user's finger will block light emitted from the optical transmitter 1041 so that the state of the optical receiver 1042 is changed, while a low level signal will be transmitted through the alarm pin to the communication single board. Accordingly, the communication single board adjusts services of communication ports of the communication single board, i.e., the communication single board stops a service of a communication port corresponding to the optical module about to be pulled out, and allocates corresponding communication signals to a communication port corresponding to another optical module for processing. In this manner, the optical module can be pulled out without any data traffic loss, and traffic packet loss can be avoided, thereby improving the communication quality. In order to prevent the optical transmitter 1041 and the optical receiver 1042 from affecting the user's pulling of the traction member 103, the optical transmitter 1041 and the optical receiver 1042 are respectively embedded in the grooves of the first connecting portion 1032 and the second connecting portion 1033, and each of the optical transmitter 1041 and the optical receiver 1042 has a height generally greater than or equal to the depth of the corresponding groove, so that the performance of the optical transmitter 1041 and the optical receiver 1042, and the appearance design of the optical module, are not affected.

In some embodiments, the first sensor 104 includes: a micro switch located on the handheld portion 1031, the first connecting portion 1032, or the second connecting portion 1033.

As shown in FIG. 2, the first sensor 104 may specifically include or be a micro mechanical key, and when a user pulls the traction member 103, the user hooks the handheld portion 1031 of the traction member 103 with a finger and applies a force. When the optical module is inserted into the communication port of the communication single board with no other action applied, the micro switch is in a state in which the alarm pin in the main body structure 105 may transmit a high level signal, while other pins may transmit corresponding communication signals, so as to implement communication between the optical module and the communication single board. When the optical module needs to be pulled out, the user pulls the traction member 103 of the optical module so that the traction member 103 drives the sliding sheet 1021 of the unlocking member 102 to slide on the sliding track 1011 along a pulling direction, and the snap-fit fastener 1022 is ejected outwardly, thereby the optical module is unlocked from the locking structure of the communication port. At this time, the micro switch may be triggered so that the state of the micro switch is changed, while a low level signal will be transmitted through the alarm pin to the communication single board. Accordingly, the communication single board adjusts a service of a communication port of the communication single board, i.e., the communication single board stops a service of a communication port corresponding to the optical module about to be pulled out, and allocates corresponding communication signals to a communication port corresponding to another optical module for processing. In this manner, the optical module can be pulled out without any data traffic loss, and traffic packet loss can be avoided, thereby improving the communication quality. In order to prevent the micro switch from affecting the user's pulling of the traction member 103, the micro switch is embedded in a groove of the handheld portion 1031, the first connecting portion 1032, or the second connecting portion 1033, and has a height generally greater than or equal to the depth of the groove, so that the performance of the micro switch and the appearance design of the optical module are not affected.

It will be understood that the first sensor 104 in the optical module provided in the embodiments of the present disclosure may be of other types besides those mentioned above, the implementation principle of which is similar to that of the first sensor 104 described above and thus will not be repeated here.

In some embodiments, the housing 101 further has a top portion opposite to the bottom portion; a baffle sheet is provided on the top portion; and the optical module further includes a return spring 106. One end of the return spring 106 is connected to the baffle sheet, and the other end of the return spring 106 is connected to the sliding sheet 1021.

The baffle sheet may be formed by stamping a part of the top portion of the housing 101 inward, and thereby forms an opening at the top portion of the housing 101. The baffle sheet may be used to fasten one end of the return spring 106, while the other end of the return spring 106 may be connected to the sliding sheet 1021. When the sliding sheet 1021 slides in the sliding track 1011, the return spring 106 may apply a stress on the sliding sheet 1021 in a direction opposite to the pulling direction; and when the external force disappears, the return spring 106 may restore the sliding sheet 1021 to its original position, thereby implementing resetting of the sliding sheet 1021 and the snap-fit fastener 1022.

Figure 6:
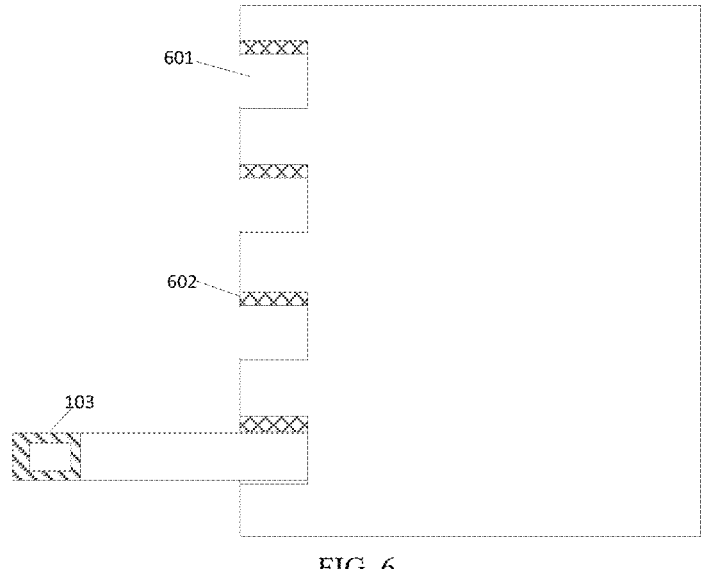
FIG. 6 is a schematic structural diagram of a communication single board according to an embodiment of the present disclosure.

In a second aspect, an embodiment of the present disclosure further provides a communication single board. FIG. 6 is a schematic structural diagram of the communication single board according to an embodiment of the present disclosure. As shown in FIG. 6, the communication single board includes: a plurality of communication ports 601, each communication port 601 being connected to an optical module including a traction member 103. The communication single board further includes a second sensor 602. A locking structure is provided in the communication port 601. The second sensor 602 is located on the locking structure, and is configured to generate an alarm signal when the traction member 103 is detected to be pulled to cause the communication single board to adjust a service of a communication port 601 of the communication single board.

When an optical module is plugged into a communication port of the communication single board, the optical module is locked with the communication port 601 of the communication single board, so that the entire optical module cannot be pulled out of the communication port 601 of the communication single board, and the signal transmission effect is prevented from being affected by looseness between the optical module and the communication port of the communication single board in the application process. When pulling the optical module out of the communication port 601 of the communication single board, the user pulls the traction member 103 with his/her hand so that the optical module is unlocked from the locking structure of the communication port 601, while no actual relative movement occurs between the optical module and the communication port 601 of the communication single board. There is a certain time difference between this process and the time of formally pulling the optical module out of the communication port 601 of the communication single board. During this process, the second sensor 602 may detect that the user is about to pull the optical module out of the communication port of the communication single board. Then, the second sensor 602 may generate an alarm signal, and the communication single board may adjust a service of a communication port of the communication single board according to the alarm signal, for example, stop a service of the corresponding communication port and allocate corresponding communication signals to another communication port for processing. In this manner, it can be ensured that normal services at each communication port in the communication single board are not affected when the optical module is pulled out of the communication port of the communication single board, and data traffic packet loss can be avoided, thereby improving the communication quality.

It will be understood that the second sensor 602 in the communication single board provided in the embodiments of the present disclosure may be of the same type as the first sensor 104 in the optical module provided in the foregoing embodiments, and the implementation principle is similar and thus will not be repeated here.

In a third aspect, an embodiment of the present disclosure provides a communication device. The communication device includes the optical module and the communication single board according to the first aspect, the optical module being connected to the communication port of the communication single board. The communication device may be a router, a switch, or any other terminal device, the implementation principle of which is similar to that of the optical module provided in the first aspect and thus will not be repeated here.

In a fourth aspect, an embodiment of the present disclosure provides a communication device. The communication device includes the communication single board and the optical module according to the second aspect, the optical module being connected to the communication port of the communication single board. The communication device may be a router, a switch, or any other terminal device, the implementation principle of which is similar to that of the communication single board provided in the second aspect and thus will not be repeated here.

Figure 7:
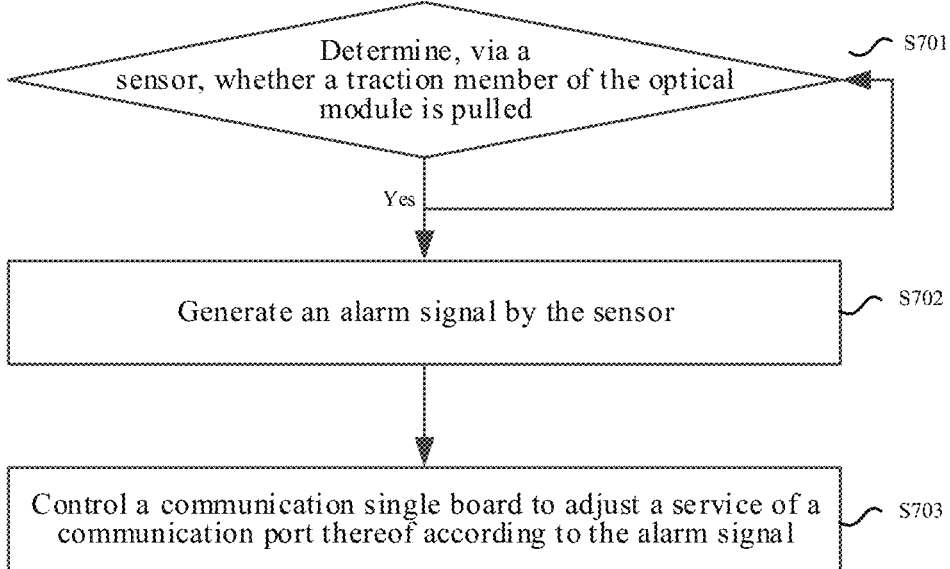
FIG. 7 is a schematic flowchart of a detection method for detecting pre-pullout of an optical module according to an embodiment of the present disclosure.

In a fifth aspect, an embodiment of the present disclosure provides a detection method for detecting pre-pullout of an optical module. FIG. 7 is a schematic flowchart of a detection method for detecting pre-pullout of an optical module according to an embodiment of the present disclosure. As shown in FIG. 7, the pre-pullout method for an optical module includes the following operations S701 to S703.

At operation S701, determining, via a sensor, whether a traction member of the optical module is pulled.

If it is determined that the traction member of the optical module is pulled, proceed to operation S702; and if it is determined that the traction member of the optical module is not pulled, repeat operation S701.

At operation S702, generating an alarm signal by the sensor.

At operation S703, controlling a communication single board to adjust a service of a communication port of the communication single board according to the alarm signal.

It should be noted that the sensor in the above method may be installed on the optical module, or on the communication single board, or on a metal cage, which may be set according to actual needs. It will be understood that the implementation principle of the detection method for detecting pre-pullout of the optical module provided in the embodiment of the present disclosure is similar to that of the optical module provided in the first aspect, and thus will not be repeated here.

It will be understood that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. An optical module, comprising: a housing, an unlocking member, a traction member, and a first sensor, wherein the housing has a first side portion and a second side portion arranged opposite each other, and at least one of the first side portion or the second side portion is provided with a sliding track and a limiting hole;

wherein the unlocking member comprises: a sliding sheet and a snap-fit fastener connected to the sliding sheet, wherein the sliding sheet is reciprocatable along the sliding track, and the snap-fit fastener is disposed in the limiting hole;

wherein the traction member is connected to an end of the sliding sheet away from the snap-fit fastener; and wherein the first sensor is located on the traction member, and is configured to generate an alarm signal when the traction member is pulled, and send the alarm signal to a communication single board, to cause the communi-cation single board to adjust a service of a communication port of the communication single board.

2. The optical module of claim 1, wherein the housing further has a bottom portion connected to both the first side portion and the second side portion; and the optical module further comprises a main body structure; and wherein the main body structure is fixed on the bottom portion; the main body structure is provided with a plurality of redundant pins; and at least one of the plurality of redundant pins is multiplexed as an alarm pin configured to transmit the alarm signal.

3. The optical module of claim 1, wherein the traction member comprises: a handheld portion, and a first connecting portion and a second connecting portion arranged opposite to each other;

wherein the handheld portion is connected to the sliding sheet through the first connecting portion and the second connecting portion; and wherein the first sensor is located on the handheld portion, the first connecting portion, or the second connecting portion.

4. The optical module of claim 3, wherein the first sensor comprises a micro mechanical key located on the handheld portion.

5. The optical module of claim 3, wherein the first sensor comprises a pressure sensor located on the handheld portion.

6. The optical module of claim 3, wherein the first sensor comprises an optical transmitter and an optical receiver; the optical transmitter is located on the first connecting portion; and the optical receiver is located on the second connecting portion.

7. The optical module of claim 3, wherein the first sensor comprises a micro switch; the micro switch is located on the handheld portion, the first connecting portion, or the second connecting portion.

8. The optical module of claim 3, wherein the handheld portion, the first connecting portion, or the second connecting portion is provided with a groove into which the first sensor is embedded, and the first sensor has a height greater than or equal to a depth of the groove.

9. The optical module of claim 2, wherein the housing further has a top portion opposite to the bottom portion; a baffle sheet is provided on the top portion; and the optical module further comprises a return spring;

wherein one end of the return spring is connected to the baffle sheet, and the other end of the return spring is connected to the sliding sheet.

10. The optical module of claim 1, wherein the optical module is configured such that in a first stage of a process of pulling the optical module out of the communication port by pulling the traction member, a relative position between the housing of the optical module and the communication port remains unchanged, and the sliding sheet is moved relative to the sliding track, so that the optical module is unlocked relative to the communication port through the snap-fit fastener; and in a second stage of the process, a relative position between the sliding sheet and the sliding track remains unchanged, while the housing is moved in a direction away from the communication port.

11. A communication single board, comprising a plurality of communication ports each adapted to be connected to an optical module; wherein the optical module comprises a traction member;

wherein the communication single board comprises a second sensor; and wherein each communication port is provided with a locking structure therein, the second sensor is provided on the locking structure, and the second sensor is configured to generate an alarm signal when the traction member is pulled, to cause the communication single board to adjust a service of a communication port of the communication single board.

12. The communication single board of claim 11, wherein the communication single board adjusting the service of the communication port of the communication single board comprises: stopping a service of the communication port corresponding to the optical module to be pulled out, and allocating communication signals corresponding to the service to another communication port for processing.

13. The communication single board of claim 11, wherein the locking structure is configured to lock the optical module to the communication port, and the locking structure is capable of being unlocked by the traction member.

14. A communication device, comprising the optical module and the communication single board of claim 1; wherein the optical module is connected to the communication port of the communication single board.

15. A communication device, comprising the communication single board and the optical module of claim 11; wherein the optical module is connected to the communication port of the communication single board.

16. A detection method for detecting pre-pullout of an optical module, comprising:

determining, via a sensor, whether a traction member of the optical module is pulled;

generating an alarm signal by the sensor in response to determining that the traction member of the optical module is pulled; and controlling a communication single board to adjust a service of a communication port of the communication single board according to the alarm signal.

17. The detection method of claim 16, wherein the optical comprises:

a housing, an unlocking member, the traction member, and the sensor, wherein the housing has a first side portion and a second side portion arranged opposite each other, and at least one of the first side portion or the second side portion is provided with a sliding track and a limiting hole;

wherein the unlocking member comprises: a sliding sheet and a snap-fit fastener connected to the sliding sheet, wherein the sliding sheet is reciprocatable along the sliding track, and the snap-fit fastener is disposed in the limiting hole;

wherein the traction member is connected to an end of the sliding sheet away from the snap-fit fastener; and wherein the first sensor is located on the traction member, and is configured to generate the alarm signal.

18. The optical module of claim 2, wherein the main body structure is an optical module gold finger.

19. The optical module of claim 3, wherein the handheld portion, the first connecting portion and the second connecting portion form a U-shaped structure with a space for insertion of a finger of a user.

20. The communication single board of claim 11, wherein the second sensor comprises a micro mechanical key or a pressure sensor.

\*   \*   \*   \*   \*